United States Patent [19]

Barbee et al.

[11] Patent Number: 4,988,793

[45] Date of Patent: Jan. 29, 1991

[54] POWDER COATING COMPOSITIONS

[75] Inventors: Robert B. Barbee; Brian S. Phillips, both of Kingsport, Tenn.

[73] Assignee: Eastman Kodak Company, Rochester, N.Y.

[21] Appl. No.: 355,705

[22] Filed: May 23, 1989

[51] Int. Cl.$^5$ .............................................. C08G 63/20
[52] U.S. Cl. ................................... 528/272; 528/283; 528/308.6; 528/310; 528/323; 528/45; 525/437; 525/440; 525/445; 524/434; 428/423.1; 428/425.9; 428/480; 428/482
[58] Field of Search ...................... 528/272, 283, 308.6, 528/310, 323, 45; 525/437, 440, 445; 524/434; 428/423.1, 425.9, 480, 482

[56] References Cited

U.S. PATENT DOCUMENTS

| | | | |
|---|---|---|---|
| 3,822,240 | 7/1974 | Schmitt et al. | 428/402 |
| 3,842,021 | 10/1974 | Grant et al. | 428/402 |
| 4,012,363 | 3/1977 | Bruning et al. | 528/308 |
| 4,150,211 | 4/1979 | Miller et al. | 528/45 |
| 4,745,148 | 5/1988 | Chung et al. | 524/504 |
| 4,861,672 | 8/1989 | Miyabayashi et al. | 428/458 |
| 4,957,814 | 9/1990 | Barbee et al. | 428/402 |

FOREIGN PATENT DOCUMENTS 62-240368  7/1976  Japan.

*Primary Examiner*—John Kight, III
*Assistant Examiner*—Sam A. Acquah
*Attorney, Agent, or Firm*—J. Frederick Thomsen; William P. Heath, Jr.

[57] ABSTRACT

Disclosed are thermosetting, powder coating compositions comprised of certain novel polyesters comprised of residues of terephthalic acid and 1,3-bis(2-hydroxyethoxy)benzene in combination with a blocked polyisocyanate which, when applied to a substrate and heated, provide cross-linked coatings having a combination of desirable properties including good gloss, impact strength and flexibility.

17 Claims, No Drawings

POWDER COATING COMPOSITIONS

This invention concerns novel polymer compositions useful for formulating powder coating compositions. More particularly, this invention concerns certain novel amorphous polyesters, polymer compositions comprising the amorphous polyesters and blocked isocyanates, powder coating compositions based thereon and coatings derived from the powder coating compositions.

Plastic materials used in the manufacture of powder coatings are classified broadly as either thermosetting or thermoplastic. In the application of thermoplastic powder coatings, heat is applied to the coating on the substrate to melt the particles of the powder coating and thereby permit the particles to flow together and form a smooth coating.

Thermosetting coatings, when compared to coatings derived from thermoplastic compositions, generally are tougher, more resistant to solvents and detergents, have better adhesion to metal substrates and do not soften when exposed to elevated temperatures. However, the curing of thermosetting coatings has created problems in obtaining coatings which have, in addition to the above-stated desirable characteristics, good smoothness and flexibility. Coatings prepared from thermosetting powder compositions, upon the application of heat, may cure or set prior to forming a smooth coating, resulting in a relatively rough finish referred to as an "orange peel" surface. Such a coating surface or finish lacks the gloss and luster of coatings typically obtained from thermoplastic compositions. The "orange peel" surface problem has caused thermosetting coatings to be applied from organic solvent systems which are inherently undesirable because of the environmental and safety problems occasioned by the evaporation of the solvent system. Solvent-based coating compositions also suffer from the disadvantage of relatively poor percent utilization, i.e., in some modes of application, only 60 percent or less of the solvent-based coating composition being applied contacts the article or substrate being coated. Thus, a substantial portion of solvent-based coatings can be wasted since that portion which does not contact the article or substrate being coated obviously cannot be reclaimed.

In addition to exhibiting good gloss, impact strength and resistance to solvents and chemicals, coatings derived from thermosetting coating compositions must possess, for certain end uses, good to excellent flexibility. For example, good flexibility is essential for powder coating compositions used to coat sheet (coil) steel which is destined to be formed or shaped into articles used in the manufacture of various household appliances and automobiles wherein the sheet metal is flexed or bent at various angles.

We have discovered that coatings having good to excellent gloss, hardness, impact strength (toughness) and flexibility may be obtained from powder coating compositions comprising an intimate blend, typically in a finely divided form, of:

(1) a novel polyester having a glass transition temperature (Tg) of at least 40° C., a hydroxyl number of about 20 to 200, an acid number of 0 to about 15 and an inherent viscosity of about 0.1 to 0.5 comprised of:
 (a) diacid residues comprising at least 50 mole percent terephthalic acid residues; and
 (b) diol residues comprising from about 20 to 100 mole percent 1,3-bis(2-hydroxyethoxy)benzene residues and from 0 to about 80 mole percent of 2,2-dimethyl-1,3-propanediol residues; and (2) a cross-linking effective amount of a blocked polyisocyanate compound.

We have discovered that coatings having improved flexibility, without any significant decrease in toughness or hardness, may be obtained from the above-described compositions due to the presence therein of the polyester in which the diol component consists entirely or in part of residues of 1,3-bis(2-hydroxyethoxy)benzene, also known as resorcinol di($\beta$-hydroxyethyl) ether.

The polyester provided by our invention may be produced using well-known polycondensation procedures employing an excess of glycol to obtain a polymer having the specified hydroxyl number. The polyester consists of repeating, alternating residues of dicarboxylic acids and diols wherein the diacid residues comprise at least 50 mole percent of terephthalic acid residues. Up to 50 mole percent of the diacid residues may be residues of various aliphatic, alicyclic and aromatic dicarboxylic acids containing about 4 to 10 carbon atoms such as succinic, glutaric, adipic, azelaic, sebacic, fumaric, maleic, itaconic, 1,3- and 1,4-cyclohexanedicarboxylic, phthalic and isophthalic acids. The diacid residues may be derived from the dicarboxylic acids or from ester-forming derivatives thereof such as dialkyl esters and/or anhydrides.

The diol residues of the polyester are derived from 1,3-bis(2-hydroxyethoxy)benzene or a mixture of 1,3-bis(2-hydroxyethoxy)benzene and 2,2-dimethyl-1,3-propanediol. The diol residues also may include up to about 10 mole percent of residues of one or more other diols such as, for example, residues of ethylene glycol, propylene glycol, 1,3-propanediol, triethylene glycol, 2,4-dimethyl-2-ethylhexane-1,3-diol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, thiodiethanol, 1,2-, 1,3- and 1,4-cyclohexanedimethanol, 2,2,4,4-tetramethyl-1,3-cyclobutanediol, 1,4-xylylene- diol and the like. A minor amount, e.g., up to 10 mole percent, of the glycol and/or diacid residues may be replaced with branching agents, e.g., tri-functional residues derived from trimethylolethane, trimethylolpropane and trimellitic anhydride.

The preferred amorphous polyester of this invention has a Tg greater than 50° C., a hydroxyl number in the range of about 30 to 65, an acid number of not more than 10 and an inherent viscosity of about 0.10 to 0.25. As used herein, the term "amorphous" refers to a polyester which exhibits no, or only a trace of, crystallization or melting point as determined by differential scanning calorimetry (DSC). The amorphous polyester component preferably is comprised of (1) diacid residues of which at least 90 mole percent are terephthalic acid residues and (2) diol residues comprised of 25 to 100 mole percent of 1,3-bis(2-hydroxyethoxy)benzene residues, 0 to about 75 mole percent 2,2-dimethyl-1,3-propanediol residues and up to 10 mole percent of ethylene glycol or 1,4-cyclohexanedimethanol residues.

The blocked polyisocyanate compounds of the compositions of this invention are known compounds and can be obtained from commercial sources or may be prepared according to published procedures. Upon being heated to cure coatings of the compositions, the compounds are unblocked and the isocyanate groups react with hydroxy groups present on the polyester to cross-link the polymer chains and thus cure the compositions to form tough coatings. Examples of the blocked polyisocyanate cross-linking component include those which are based on isophorone diisocyanate blocked with ε-caprolactam, commercially available as Hüls 1530 and Cargill 2400, or toluene 2,4-diisocyanate blocked with ε-caprolactam, commercially available as Cargill 2450, and phenol-blocked hexamethylene diisocyanate.

The most readily-available, and thus the preferred, blocked polyisocyanate cross-linking agents or compounds are those commonly referred to as ε-caprolactam-blocked isophorone diisocyanate, e.g., those described in U.S. Pat. Nos. 3,822,240, 4,150,211 and 4,212,962. However, the products marketed as ε-caprolactam-blocked isophorone diisocyanate may consist primarily of the blocked, difunctional, monomeric isophorone diisocyanate, i.e., a mixture of the cis and trans isomers of 3-isocyanatomethyl-3,5,5-trimethyl-cyclohexylisocyanate, the blocked, difunctional dimer thereof, the blocked, trifunctional trimer thereof or a mixture of the monomeric, dimeric and/or trimeric forms. For example, the blocked polyisocyanate compound used as the cross-linking agent may be a mixture consisting primarily of the ε-caprolactam-blocked, difunctional, monomeric isophorone diisocyanate and the ε-caprolactam-blocked, trifunctional trimer of isophorone diisocyanate. The description herein of the cross-linking agents as "polyisocyanates" refers to compounds which contain at least two isocyanato groups which are blocked with, i.e., reacted with, another compound, e.g., ε-caprolactam. The reaction of the isocyanato groups with the blocking compound is reversible at elevated temperatures, e.g., about 150° C. and above, at which temperature the isocyanato groups are available to react with the hydroxyl groups present on the amorphous polyester to form urethane linkages.

The amount of the blocked diisocyanate cross-linking compound present in the powder coating compositions of our invention can be varied depending on several factors such as the particular polyester and cross-linking agent employed, the degree of pigment loading, the properties required of the coatings to be prepared from the compositions, etc. Typically, the amount of cross-linking compound which will effectively cross-link the hydroxy-containing polymers to produce coatings having a good combination of properties is in the range of about 5 to 30 weight percent, preferably 15 to 25 weight percent, based on the total weight of the amorphous polyester or polyester blend and the cross-linking compound.

The powder coating compositions of our invention may be prepared from the compositions described herein by dry-mixing and then melt-blending the amorphous polyester and the blocked polyisocyanate compound, along with other additives commonly used in powder coatings, and then grinding the solidified blend to a particle size, e.g., an average particle size in the range of about 10 to 300 microns, suitable for producing powder coatings. For example, the ingredients of the powder coating composition may be dry blended and then melt blended in a Brabender extruder at 90° to 130° C., granulated and finally ground. The melt blending should be carried out at a temperature sufficiently low to prevent the unblocking of the polyisocyanate cross-linking compound and thus avoid premature cross-linking.

Typical additives which may be present in the powder coating compositions include benzoin, used to reduce entrapped air or volatiles, flow aids or flow control agents which aid the formation of a smooth, glossy surface, catalysts to promote the cross-linking reaction between the isocyanate groups of the cross-linking agent and the hydroxyl groups on the polymers, stabilizers, pigments and dyes. Although it is possible to cure or cross-link the composition without the use of a catalyst, it is usually desirable to employ a catalyst to aid the cross-linking reaction, e.g., in an amount of about 0.05 to 2.0 weight percent cross-linking catalyst based on the total weight of the amorphous polyester and the cross-linking agent. Suitable catalysts for promoting the cross-linking include organo-tin compounds such as dibutyltin dilaurate, dibutyltin dimaleate, dibutyltin oxide, stannous octanoate and similar compounds.

The powder coating compositions preferably contain a flow aid, also referred to as flow control or leveling agents, to enhance the surface appearance of cured coatings of the powder coating compositions. Such flow aids typically comprise acrylic polymers and are available from several suppliers, e.g., Modaflow from Monsanto Company and Acronal from BASF. Other flow control agents which may be used include Modarez MFP available from Synthron, EX 486 available from Troy Chemical, BYK 360P available from BYK Mallinkrodt and Perenol F-30-P available from Henkel. A specific flow aid is an acrylic polymer having a molecular weight of about 17,000 and containing 60 mole percent 2-ethylhexyl methacrylate residues and about 40 mole percent ethyl acrylate residues. The amount of flow aid present may be in the range of about 0.5 to 4.0 weight percent, based on the total weight of the polyester and the cross-linking agent.

The powder coating compositions may be deposited on various metallic and non-metallic substrates by known techniques for powder deposition such as by means of a powder gun, by electrostatic deposition or by deposition from a fluidized bed. In fluidized bed sintering, a preheated article is immersed into a suspension of the powder coating in air. The particle size of the powder coating composition normally is in the range of 60 to 300 microns. The powder is maintained in suspension by passing air through a porous bottom of the fluidized bed chamber. The articles to be coated are preheated to about 250° to 400° F. (about 121° to 205° C.) and then brought into contact with the fluidized bed of the powder coating composition. The contact time depends on the thickness of the coating that is to be produced and typically is from 1 to 12 seconds. The temperature of the substrate being coated causes the powder to flow and thus fuse together to form a smooth, uniform, continuous, uncratered coating. The temperature of the preheated article also affects cross-linking of the coating composition and results in the formation of a tough coating having a good combination of properties. Coatings having a thickness between 200 and 500 microns may be produced by this method.

The compositions also may be applied using an electrostatic process wherein a powder coating composition having a particle size of less than 100 microns, preferably about 15 to 50 microns, is blown by means of compressed air into an applicator in which it is charged with a voltage of 30 to 100 kV by high-voltage direct current. The charged particles then are sprayed onto the grounded article to be coated to which the particles adhere due to the electrical charge thereof. The coated article is heated to melt and cure the powder particles. Coating of 40 to 120 microns thickness may be obtained.

Another method of applying the powder coating compositions is the electrostatic fluidized bed process which is a combination of the two methods described above. For example, annular or partially annular electrodes are mounted over a fluidized bed so as to produce an electrostatic charge such as 50 to 100 kV. The article to be coated, either heated, e.g., 250° to 400° F., or cold, is exposed briefly to the fluidized powder. The coated article then can be heated to effect cross-linking if the article was not preheated to a temperature sufficiently high to cure the coating upon contact of the coating particles with the article.

The powder coating compositions of this invention may be used to coat articles of various shapes and sizes constructed of heat-resistant materials such as glass, ceramic and various metal materials. The compositions are especially useful for producing coatings on articles constructed of metals and metal alloys, particularly steel articles.

The compositions and coatings of our invention are further illustrated by the following examples. The inherent viscosities (I.V.; dl/g) referred to herein were measured at 25° C. using 0.5 g polymer per 100 mL of a solvent consisting of 60 parts by weight phenol and 40 parts by weight tetrachloroethane. Acid and hydroxyl numbers were determined by titration and are reported herein as mg of KOH consumed for each gram of polymer. The glass transition temperatures (Tg) were determined by differential scanning calorimetry (DSC) on the second heating cycle at a scanning rate of 20° C. per minute after the sample has been heated to melt and quenched to below the Tg of the polymer. Tg values are reported as the midpoint of the transition.

Coatings were prepared on 3 inch by 9 inch panels of 24-gauge, polished, cold roll steel, the surface of which has been zinc phosphated (Bonderite 37, The Parker Company). Impact strengths were determined using an impact tester (Gardner Laboratory, Inc.) according to ASTM D2794-84. A weight with a ⅝-inch diameter, hemispherical nose was dropped within a slide tube from a specified height to drive into the front (coated face) or back of the panel. The highest impact which did not crack the coating was recorded in inch-pounds, front and reverse. The 20° and 60° gloss values were measured using a multi-angle, analog laboratory glossmeter.

The pencil hardness of the coatings was determined according to ASTM 3363-74 (reapproved 1980) and is reported as the hardest lead which does not cut into the coating. The results of the pencil hardness test are expressed according to the following scale: (softest) 6B, 5B, 4B, 3B, 2B, B, HB, F, H, 2H, 3H, 4H, 5H, 6H (hardest). The conical mandrel test is conducted according to ASTM 522-85 by bending a panel over a 15 second period using a conical mandrel (Gardner Laboratory, Inc.) of a specified size. A pass or fail is recorded.

The flexibility, referred to herein as "T-bend flexibility", of the coatings was determined in accordance with ASTM 4145-83 at ambient temperature by bending or folding a coated panel back against itself, using a hydraulic jack pressurized to 20,000 pounds per square inch (psi), until the apex of the bend is as flat as can be reasonably achieved. This initial bend is referred to as 0T meaning that there is nothing (zero thicknesses) between the bent portions of the panel. The bend is examined using a 10X magnifying glass and, if fractures of the coating are observed, the panel is bent a second time (1T) to form a three-layer sandwich. The second bend is inspected for coating fracture and this procedure is repeated, forming 4-, 5-, 6-, etc. layer sandwiches, until a bend exhibits no fracture of the coating. The result of each bend test is the minimum thickness (minimum T-bend) of the bend which does not give any fractures of the coating. Although the bend test used is excessively severe for most purposes for which coated articles are used, it provides a means to compare the flexibilities of different powder coating compositions.

EXAMPLE 1

A 2000 mL, 3-necked, round-bottom flask was charged with terephthalic acid (611.80 g, 3.68 mol), 2,2-dimethyl-1,3-propanediol (318.94 g, 3.06 mol), 1,3-bis(2-hydroxyethoxy)benzene (202.33 g, 1.02 mol) and butylstannoic acid (1.0 g). The contents of the flask were heated to and maintained, under nitrogen, at 200° C. for 2 hours with stirring. The temperature then was raised to 215° C. for 2 hours while distilling off water from the reaction mixture. The reaction mixture then was heated to and maintained at 235° C. for 8 hours. The molten polymer was poured into a syrup can where it was allowed to cool to a solid. The polyester thus obtained had an I.V. of 0.17, a Tg of 54° C., a hydroxyl number of 40 and an acid number of 3.

EXAMPLE 2

A powder coating composition was prepared from the following materials:

892.00 g Polyester of Example 1;
179.00 g Caprolactam-blocked isophorone polyisocyanate (Hüls 1530);
11.25 g Dibutyltin dilaurate;
11.25 g Benzoin;
16.88 g Modaflow flow control agent; and
450.00 g Titanium dioxide.

The above materials were mixed in a Banbury mixer at 80° C. for five minutes, ground in a Bantam mill to which a stream of liquid nitrogen was fed and classified through a 200 mesh screen on an Alpine sieve. The finely-divided, powder coating composition obtained had an average particle size of about 50 microns.

The powder coating composition was applied electrostatically to one side of the 3 inch by 9 inch panels described hereinabove. The coatings were cured (crosslinked) by heating the coated panels at 177° C. in an oven for 25 minutes. The cured coatings were about 50 microns thick.

The coatings on the panels had both front and back impact strengths of >160 inch-pounds, 20° and 60° gloss values of 75 and 90, respectively, and a pencil hardness of HB. The coated panels passed a 0.125 inch conical mandrel test and had a T-bend flexibility value of 1.

EXAMPLE 3

A 2000 mL, 3-necked, round-bottom flask was charged with terephthalic acid (555.31 g, 3.34 mol), 2,2-dimethyl-1,3-propanediol (194.96 g, 1.87 mol), 1,3-bis(2-hydroxyethoxy)benzene (371.30 g, 1.87 mol) and butylstannoic acid (1.0 g). The contents of the flask were reacted, polymerized and isolated according to the procedure described in Example 1. The polyester thus obtained had an I.V. of 0.19, a Tg of 51° C., a hydroxyl number of 47.5 and an acid number of 3.

EXAMPLE 4

Using the procedure described in Example 2, a powder coating composition was prepared from the following materials:
900.00 g Polyester of Example 3;
213.40 g Caprolactam-blocked isophorone polyisocyanate (Hüls 1530);
11.25 g Dibutyltin dilaurate;
11.25 g Benzoin;
16.88 g Modaflow flow control agent; and
450.00 g Titanium dioxide.

This powder coating composition was applied electrostatically to one side of 3 inch by 9 inch panels and cured as described in Example 2. The cured coatings were about 50 microns thick.

The coatings on the panels had both front and back impact strengths of >160 inch-pounds, 20° and 60° gloss values of 70 and 88, respectively, and a pencil hardness of HB. The coated panels passed a 0.125 inch conical mandrel test and had a T-bend flexibility value of 1.

EXAMPLE 5

A 2000 mL, 3-necked, round-bottom flask was charged with terephthalic acid (507.57 g, 3.06 mol), 2,2-dimethyl-1,3-propanediol (90.01 g, 0.865 mol), 1,3-bis(2-hydroxyethoxy)benzene (512.81 g, 2.59 mol) and butylstannoic acid (1.0 g). The contents of the flask were reacted, polymerized and isolated according to the procedure described in Example 1. The polyester thus obtained had an I.V. of 0.16, a Tg of 47° C., a hydroxyl number of 46 and an acid number of 3.

EXAMPLE 6

Using the procedure described in Example 2, a powder coating composition was prepared from the following materials:
893.90 g Polyester of Example 5;
206.10 g Caprolactam-blocked isophorone polyisocyanate (Hüls 1530);
8.00 g Dibutyltin dilaurate;
8.00 g Benzoin;
22.00 g Modaflow flow control agent; and
440.00 g Titanium dioxide.

This powder coating composition was applied electrostatically to one side of 3 inch by 9 inch panels and cured as described in Example 2. The cured coatings were about 50 microns thick.

The coatings on the panels had both front and back impact strengths of >160 inch-pounds, 20° and 60° gloss values of 85 and 96, respectively, and a pencil hardness of HB. The coated panels passed a 0.125 inch conical mandrel test and had a T-bend flexibility value of 1.

EXAMPLE 7

A 3000 mL, 3-necked, round-bottom flask was charged with terephthalic acid (816.03 g, 4.916 mol), 1,3-bis(2-hydroxyethoxy)benzene (1110.79 g, 5.610 mol) and butylstannoic acid (1.5 g). The contents of the flask were reacted, polymerized and isolated according to the procedure described in Example 1. The polyester thus obtained had an I.V. of 0.16, a Tg of 47° C., a hydroxyl number of 45 and an acid number of 3.

EXAMPLE 8

Using the procedure described in Example 2, a powder coating composition was prepared from the following materials:
1633.85 g Polyester of Example 7;
366.15 g Caprolactam-blocked isophorone polyisocyanate (Hüls 1530);
14.50 g Dibutyltin dilaurate;
14.50 g Benzoin;
40.00 g Modaflow flow control agent; and
800.00 g Titanium dioxide.

This powder coating composition was applied electrostatically to one side of 3 inch by 9 inch panels and cured as described in Example 2. The cured coatings were about 50 microns thick.

The coatings on the panels had both front and back impact strengths of >160 inch-pounds, 20° and 60° gloss values of 87 and 95, respectively, and a pencil hardness of HB. The coated panels passed a 0.125 inch conical mandrel test and had a T-bend flexibility value of 1.

COMPARATIVE EXAMPLE 1

A 1000 mL, 3-necked, round-bottom flask was charged with terephthalic acid (339.87 g, 2.046 mol), 2,2-dimethyl-1,3-propanediol (233.77 g, 2.244 mol), and butylstannoic acid (0.5 g). The contents of the flask were reacted, polymerized and isolated according to the procedure described in Example 1. The polyester thus obtained had an I.V. of 0.18, a Tg of 63° C., a hydroxyl number of 33 and an acid number of 4.

COMPARATIVE EXAMPLE 2

A powder coating composition was prepared according to the procedure described in Example 2 from the following ingredients:
343.43 g Polyester prepared as described in Comparative Example 1;
56.57 g Caprolactam-blocked isophorone diisocyanate (Hüls 1530);
2.9 g Dibutyltin dilaurate;
2.9 g Benzoin;
8.0 g Modaflow flow control agent; and
160.0 g Titanium dioxide.

Using the procedure of Example 2, panels were coated with this powder coating composition and the coatings were cured and evaluated. The coatings had both front and back impact strengths of <160 inch-pounds, 20° and 60° gloss values of 78 and 91, respectively, and a pencil hardness of F. The coated panels failed the 0.125 inch conical mandrel test and had a T-bend flexibility value of 10.

The invention has been described in detail with particular reference to preferred embodiments thereof, but it will be understood that variations and modifications will be effected within the spirit and scope of the invention.

We claim:

1. A thermosetting coating composition in the form of a powder having an average particle size of about 10 to 300 microns comprising:
   (1) a polyester having a glass transition temperature of at least 40° C., a hydroxyl number of about 20 to 200, an acid number of 0 to about 15 and an inherent viscosity of about 0.1 to 0.5 comprised of:
      (a) diacid residues comprising at least 50 mole percent terephthalic acid residues; and (b) diol residues comprising from about 20 to 100 mole percent 1,3-bis(2-hydroxyethoxy)benzene residues and from 0 to about 80 mole percent 2,2-dimethyl-1,3-propanediol residues; and (2) a cross-linking effective amount of a blocked polyisocyanate compound.

2. A thermosetting coating composition according to claim 1 wherein the polyester has a hydroxyl number of about 30 to 65, an acid number of not more than 10 and an inherent viscosity of about 0.10 to 0.25.

3. A thermosetting coating composition according to claim 1 wherein the blocked polyisocyanate compound is an ε-caprolactam-blocked isophorone diisocyanate compound or an ε-caprolactam-blocked 2,4-toluene diisocyanate compound.

4. A thermosetting coating composition according to claim 1 containing a cross-linking catalyst.

5. A thermosetting coating composition according to claim 3 containing a cross-linking catalyst.

6. A thermosetting coating composition in the form of a powder having an average particle size of about 15 to 75 microns comprising:

(1) a polyester having a glass transition temperature of at least 50° C., a hydroxyl number of about 30 to 65, an acid number of 0 to about 10 and an inherent viscosity of about 0.10 to 0.25 comprised of:

(a) diacid residues comprising at least 90 mole percent terephthalic acid residues; and (b) diol residues comprising about 25 to 100 mole percent 1,3-bis(2-hydroxyethoxy)benzene residues and about 0 to 75 mole percent 2,2-dimethyl-1,3-propanediol residues; and (2) about 5 to 30 weight percent, based on the total weight of the polyester and the blocked isocyanate, of a blocked polyisocyanate compound.

7. A thermosetting coating composition according to claim 6 wherein the blocked polyisocyanate compound is an ε-caprolactam-blocked isophorone diisocyanate compound or an ε-caprolactam-blocked 2,4-toluene diisocyanate compound.

8. A thermosetting coating composition according to claim 6 containing about 15 to 25 weight percent, based on the total weight of the polyester and the blocked polyisocyanate, of a blocked polyisocyanate.

9. A thermosetting coating composition according to claim 8 wherein the blocked polyisocyanate compound is an ε-caprolactam-blocked isophorone diisocyanate compound or an ε-caprolactam-blocked 2,4-toluene diisocyanate compound.

10. A thermosetting coating composition according to claim 6 containing a cross-linking catalyst and a flow aid.

11. A thermosetting coating composition according to claim 10 containing about 15 to 25 weight percent, based on the total weight of the polyester and the blocked polyisocyanate, of a blocked polyisocyanate selected from an ε-caprolactam-blocked isophorone diisocyanate compound or an ε-caprolactam-blocked 2,4-toluene diisocyanate compound.

12. A thermosetting coating composition in the form of a powder having an average particle size of about 15 to 50 microns comprising:

(1) a polyester having a glass transition temperature of at least 50° C., a hydroxyl number of about 30 to 65, an acid number of 0 to about 10 and an inherent viscosity of about 0.10 to 0.25 comprised of:

(a) diacid residues comprising at least 90 mole percent terephthalic acid residues; and (b) diol residues comprising about 30 to 100 mole percent 1,3-bis(2-hydroxyethoxy)benzene residues and about 0 to 70 mole percent 2,2-dimethyl-1,3-propanediol residues; and (2) about 15 to 25 weight percent, based on the total weight of the polyester and the blocked isocyanate, of a blocked polyisocyanate compound selected from an ε-caprolactam-blocked isophorone diisocyanate compound or ε-caprolactam-blocked 2,4-toluene diisocyanate compound;

(3) an acrylic polymer flow aid; and (4) a cross-linking catalyst selected from organotin compounds.

13. An article coated with the reaction product of a composition comprising:

(1) a polyester having a glass transition temperature of at least 40° C., a hydroxyl number of about 20 to 200, an acid number of 0 to about 15 and an inherent viscosity of about 0.1 to 0.5 comprised of:

(a) diacid residues comprising at least 50 mole percent terephthalic acid residues; and (b) diol residues comprising from about 20 to 100 mole percent 1,3-bis(2-hydroxyethoxy)benzene residues and from 0 to about 80 mole percent 2,2-dimethyl-1,3-propanediol residues; and (2) a cross-linking effective amount of a blocked polyisocyanate compound.

14. An article according to claim 13 constructed of a metal coated with the reaction product of a composition comprising:

(1) a polyester having a glass transition temperature of at least 50° C., a hydroxyl number of about 30 to 65, an acid number of 0 to about 10 and an inherent viscosity of about 0.10 to 0.25 comprised of:

(a) diacid residues comprising at least 90 mole percent terephthalic acid residues; and (b) diol residues comprising about 25 to 100 mole percent 1,3-bis(2-hydroxyethoxy)benzene residues and about 0 to 75 mole percent 2,2-dimethyl-1,3-propanediol residues; and (2) about 5 to 30 weight percent, based on the total weight of the polyester and the blocked isocyanate, of a blocked polyisocyanate compound.

15. A coated article according to claim 14 wherein the article is constructed of steel.

16. A polyester containing free hydroxyl groups suitable for use in coating compositions having a glass transition temperature of at least 40° C., a hydroxyl number of about 20 to 200, an acid number of 0 to about 15 and an inherent viscosity of about 0.1 to 0.5 comprised of:

(a) diacid residues comprising at least 50 mole percent terephthalic acid residues; and (b) diol residues comprising from about 20 to 100 mole percent 1,3-bis(2-hydroxyethoxy)benzene residues and from 0 to about 80 mole percent 2,2-dimethyl-1,3-propanediol residues.

17. A polyester according to claim 16 having a glass transition temperature of at least 50° C., a hydroxyl number of about 30 to 65, an acid number of 0 to about 10 and an inherent viscosity of about 0.10 to 0.25 comprised of:

(a) diacid residues comprising at least 90 mole percent terephthalic acid residues; and (b) diol residues comprising about 25 to 100 mole percent 1,3-bis(2-hydroxyethoxy)benzene residues and about 0 to 75 mole percent 2,2-dimethyl-1,3-propanediol residues.

* * * * *